No. 671,230.  
Patented Apr. 2, 1901.
W. PAINTER.
COMPOSITE GLUTINOUS ARTICLE AND PROCESS OF MAKING SAME.
(Application filed Apr. 22, 1898. Renewed Sept. 17, 1900.)
(No Model.)
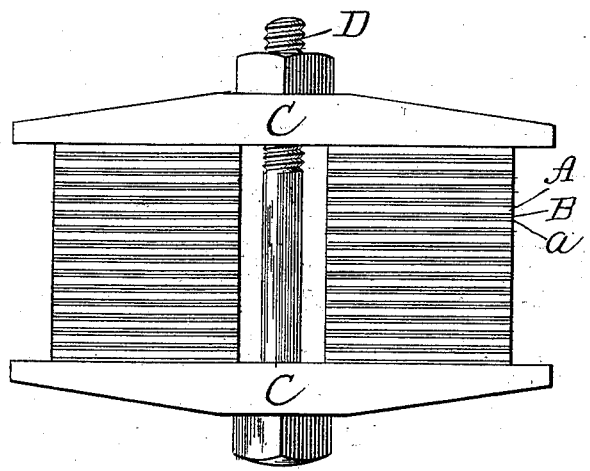
Attest  
F. L. Middleton  
C. S. Middleton
Inventor  
William Painter  
by Ellis Spear  
Atty.

UNITED STATES PATENT OFFICE.

WILLIAM PAINTER, OF BALTIMORE, MARYLAND, ASSIGNOR TO THE CROWN CORK AND SEAL COMPANY, OF SAME PLACE.

COMPOSITE GLUTINOUS ARTICLE AND PROCESS OF MAKING SAME.

SPECIFICATION forming part of Letters Patent No. 671,230, dated April 2, 1901

Application filed April 22, 1898. Renewed September 17, 1900. Serial No. 30,343. (No specimens.)

*To all whom it may concern:*

Be it known that I, WILLIAM PAINTER, a citizen of the United States, residing at Baltimore, Maryland, have invented certain new and useful Improvements in Composite Glutinous Articles and Processes of Making the Same, of which the following is a specification.

My invention relates to the manufacture of composite articles in which a glutinous compound is applied to a suitable fabric under the action of heat and pressure. Such glutinous compound may comprise as component elements gluten and a body material—such, for instance, as ground cork—or it may comprise gluten, glycerin, and said body material intimately mixed. In either case the article produced by combining the compound with the fabric possesses qualities which render it desirable for many uses. The gluten when hardened by desiccation from its wet state or indurated by heat I have found is repellent of water to a high degree and is thus especially adapted as a waterproofing medium, while the glycerin imparts to the compound pliability and flexibility, which render it useful as applied to a fabric.

In the formation of the compounds, the gluten is intimately mixed with the glycerin, so that it is dissolved therein, and then the body material is incorporated into the mixture, though this may be done at the same time that the gluten and glycerin are mixed. This body material may be ground or granulated cork or other substance of a granular, fibrogranular, or fibrous nature. In forming these compounds it is to be understood that the gluten is used in the wet plastic state which it assumes as extracted from cereal substances containing it, and that in this state it contains a proportion of water, which may be regarded as its water of constitution, the entire loss of which would render it hard and inelastic unless wholly or in part replaced by glycerin, and that in the processes herein referred to more or less of this water of constitution may be retained. It is also to be understood that owing to the well-known affinity of glycerin for water or its hygroscopic nature whatever of the water of constitution of the gluten may remain in the completed product is prevented from subsequent evaporation while exposed to the atmosphere by this affinity of glycerin for it, the glycerin itself being less volatile than the water which it may hold in combination. I have also found that in cases where the water of constitution of the plastic gluten is wholly replaced by the glycerin in the processes of combining the several ingredients if a sufficient proportion of glycerin is thus substituted for the water its affinity for water will cause it to absorb more or less of moisture from the air after the product is completed. Thus by regulating the amount of glycerin and water of constitution retained in the completed product a certain permanence is given to it as to elasticity and pliability.

In carrying out my process I use heat in order to effect the desired change in the gluten, which indurates it and renders it more impermeable to water. This step of my present method I refer to in my applications for Letters Patent of the United States filed January 14, 1898, Serial Nos. 666,662, 666,663, and 666,664. In the use of this indurating temperature higher than that of the atmosphere or in the drying of the compound at ordinary temperature there is, I have found, liability of material loss of the glycerin or water of constitution of the plastic gluten during the heating or drying. In order to avoid this and secure other results hereinafter mentioned, I carry on these parts of the method—*i. e.,* the heating or the drying—while the compounds are held under pressure. At the same time that this indurating and compressing action is being effected the compound is being intimately combined with the fabric, the same pressure which is used to prevent volatilization of the glycerin and water of constitution being utilized to unite the compound with the fabric.

In cases where I may desire to apply the compound in the form of a solution to the fabric I can after such application and a certain period of drying has elapsed complete the operation of drying or baking while the compound with the fabric is held under pressure. In other cases where the compound comprises gluten and a body material or gluten, glycerin, and a body material—such, for instance, as ground cork—I may roll the compound into sheet form, then apply it to the fabric, and then subject the same while drying or baking to pressure.

I show in the drawing how this process may be practiced, the sheets of compound being shown at A, the layers of fabric at B, the pressure-heads at C, and the connecting-bolt at D, by means of which any desired pressure may be applied. This step of subjecting the composite article to pressure while applying the heat thereto or while drying the article at ordinary temperatures measurably prevents the volatilization and escape of the glycerin and water of constitution, and thus the desirable quality of flexibility imparted to the compound and the finished article is maintained. This pressure serves also to intimately unite the compound with the fabric whether it be applied as a solution or in sheet form, and it serves to condense the compound and give to it the desired smoothness of surface and renders it less permeable to water.

The composite sheets made up of the compound and fabric may be separated from each other by strips or sheets of metal, as shown at $a$.

The press, with the material held therein under the desired pressure, is placed in an oven in order to be heated.

I claim—

1. The herein-described process consisting in applying a glutinous compound to a fabric and then subjecting the same to a drying temperature while under pressure.

2. The herein-described process consisting in applying a compound of gluten and glycerin to a fabric and then subjecting the same to a drying temperature while under pressure.

3. The herein-described process consisting in making a glutinous compound in sheet form and then applying the same under pressure to a fabric and exposing it to a drying temperature.

4. The herein-described process consisting in making a compound of gluten, glycerin and a body material into sheet form, applying the same to a fabric, under pressure, and then exposing it to a drying temperature.

5. The herein-described article consisting of a glutinous compound in sheet form combined with a fabric, substantially as described.

In testimony whereof I affix my signature in presence of two witnesses.

WILLIAM PAINTER.

Witnesses:
JOHN T. HAWKINS,
W. H. WHEELER.